United States Patent
Chiba et al.

(10) Patent No.: US 6,706,813 B2
(45) Date of Patent: Mar. 16, 2004

(54) CURABLE COMPOSITION AND METHOD OF USE THEREOF

(75) Inventors: Makoto Chiba, Kobe (JP); Shintaro Komitsu, Yokohama (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/007,000

(22) Filed: Dec. 3, 2001

(65) Prior Publication Data

US 2002/0077420 A1 Jun. 20, 2002

Related U.S. Application Data

(63) Continuation-in-part of application No. PCT/JP00/03621, filed on Jun. 5, 2000.

(30) Foreign Application Priority Data

Jun. 4, 1999 (JP) ............................................. 11-157785

(51) Int. Cl.$^7$ ............................................... C08L 23/22
(52) U.S. Cl. ............................................ 525/95; 525/96
(58) Field of Search ...................................... 525/95, 96

(56) References Cited

U.S. PATENT DOCUMENTS 6,503,531 B2 * 1/2003 Cox et al. ................... 424/448

FOREIGN PATENT DOCUMENTS

| JP | 11-158331 | 6/1999 |
| WO | 97/48778 | 12/1997 |

* cited by examiner

*Primary Examiner*—Jeffrey Mullis
(74) *Attorney, Agent, or Firm*—Hogan & Hartson LLP

(57) ABSTRACT

To provide a curable composition excellent in flexibility and heat resistance. A curable composition which comprises (A) a block copolymer having at least one kind of block formed from an aliphatic hydrocarbon compound and (B) an isobutylene polymer having a silicon group bound to a hydrolyzable group or a hydroxyl group. That composition can be used as sealants, adhesives, pressure sensitive adhesives, compositions for gaskets, double layer glazing spacers and so on.

12 Claims, No Drawings

CURABLE COMPOSITION AND METHOD OF USE THEREOF

This is a continuation-in-part application of PCT application No. PCT/JP00/03621, filed Jun. 5, 2000.

TECHNICAL FIELD

The present invention relates to a curable composition suited for use as a rubbery material, for example a tire, a sealant, a gasket, an adhesive, a pressure sensitive adhesive or a damping material, and to a method of use thereof.

BACKGROUND ART

Block copolymers containing polymer blocks comprising aliphatic hydrocarbon compounds are inexpensive and are used as thermoplastic resins having good workability in a wide range of application. In particular, block copolymers composed of a polymer block of an aliphatic hydrocarbon compound and a styrenic polymer block easily melt upon heating and therefore are used as thermoplastic elastomers having good workability for gaskets, sealants, adhesives or pressure sensitive adhesives, damping materials and so forth.

However, in the case of block copolymers containing a polymer block comprising an aliphatic hydrocarbon compound, in particular block copolymers composed of a polymer block of an aliphatic hydrocarbon compound and a styrenic polymer block, characteristics such as mechanical properties and viscosity upon melting with heating depend on the ratio between the higher Tg segment and lower Tg segment of a thermoplastic elastomer and molecular weight of each segment and, therefore, there arises the problem that attempts to improve the workability in the step of melting turn into marked reductions in physical properties at high temperatures.

In view of the above-mentioned state of the art, it is an object of the invention to mitigate the reductions in physical properties at high temperatures of block copolymers having at least one block species formed from an aliphatic hydrocarbon compound(s).

DISCLOSURE OF INVENTION

As a result of investigations, the present inventors found that the above object can be accomplished by formulating a curable composition comprising (A) a block copolymer having at least one kind of block formed from an aliphatic hydrocarbon compound and (B) an isobutylene polymer having a silicon group bound to a hydrolyzable group or a hydroxyl group.

The present invention is thus directed to a curable composition which comprises (A) a block copolymer having at least one kind of block formed from an aliphatic hydrocarbon compound and (B) an isobutylene polymer having a silicon group bound to a hydrolyzable group or a hydroxyl group.

The invention is also directed to a sealant comprising the above curable composition, an adhesive comprising the above curable composition, a pressure sensitive adhesive comprising the above curable composition, a composition for a gasket comprising the above curable composition and a double layer glazing spacer comprising the above curable composition.

The invention is further directed to a method of application for applying or molding the above curable composition in a state dissolved in a solvent, a method of application for applying or molding the above curable composition under heating condition, and a method of using which comprises allowing the condensation reaction of the (B) component to proceed with water after applying or molding the above curable composition.

In the following, the present invention is described in detail.

The block copolymer (A) having at least one block species formed from an aliphatic hydrocarbon compound to be used in accordance with the invention is first described.

The aliphatic hydrocarbon compound is not particularly restricted but may be any of those capable of forming polymers. Thus it includes, for example, ethylene, propylene, 1-butene, isobutylene, butadiene and isoprene. These may be used singly or a plurality thereof may be used in combination. These polymers may be used after hydrogenation thereof.

The block formed from an aliphatic hydrocarbon compound (hereinafter sometimes referred to as "aliphatic hydrocarbon block") in the (A) component is not particularly restricted. Relatively flexible blocks can be obtained by (1) homopolymerizing a diene compound such as butadiene or isoprene, (2) polymerizing the diene compound as mentioned above followed by hydrogenating the polymer, (3) polymerizing an olefin compound containing 1 to 6 carbon atoms, such as ethylene, propylene, 1-butene or isobutylene, as a main monomer, or (4) copolymerizing the above olefin compound and the diene compound and, using the polymer as it is or followed by hydrogenating the polymer. As relatively rigid aliphatic hydrocarbon blocks, there may be mentioned, as examples, crystalline blocks, specifically polyethylene blocks and polyhexene blocks.

The block other than the aliphatic hydrocarbon block in the (A) component is not particularly restricted but may be any of those capable of forming block copolymers with the aliphatic hydrocarbon block. Thus, it includes, for example, blocks of a vinyl aromatic compound or a nitrile compound, more specifically, blocks comprising styrene, α-methylstyrene or acrylonitrile.

In the practice of the invention, block copolymers composed of a polymer block mainly comprising a vinyl aromatic compound and a polymer block mainly comprising an aliphatic hydrocarbon compound are preferred as the (A) component block copolymer. The term "a polymer block mainly comprising a compound" means that the monomer unit corresponding to that compound accounts for at least 60%, preferably at least 80%, of the monomer units constituting that polymer block.

The composition of the (A) component is not restricted so long as the composition can manifest the desired characteristics. From the viewpoint of availability or fluidity at high temperature, there may be mentioned block copolymers composed of a styrenic block and a butadiene and/or isoprene and/or isobutylene block, and hydrogenation products derived therefrom, more specifically, SBS (styrene-butadiene-styrene block copolymers), SIS (styrene-isoprene-styrene block copolymers), SEBS (styrene-ethylenebutylene-styrene block copolymers), SEPS (styrene-ethylenepropylene-styrene block copolymers), SIBS (styrene-isobutylene-styrene block copolymers) and the like.

In the (A) component block copolymer, the ratio between the aliphatic hydrocarbon block content and the content of blocks other than the aliphatic hydrocarbon block is not particularly restricted. From the viewpoint of the balance between fluidity and physical properties, however, the ratio is preferably 5/95 to 95/5, more preferably 10/90 to 60/40, on the weight basis. The block structure may be straight-chained or have a side chain.

The number average molecular weight of the (A) component block copolymer is not particularly restricted but, generally, it is about 500 to 1,000,000, preferably about 1,000 to 100,000.

The isobutylene polymer having a silicon group bound to a hydrolyzable group or a hydroxyl group, namely the (B) component to be used in accordance with the invention, is now described. The term "a silicon group bound to a hydrolyzable group or a hydroxyl group" so referred to herein means a group having an Si—X bond in the case that X represents a hydrolyzable group or a hydroxyl group, for instance. Upon hydrolysis reaction, the Si—X bond generally gives Si—OH and H—X.

The silicon group which the (B) component isobutylene polymer has is a functional group well known in the art. As typical examples thereof, there may be mentioned a group represented by the general formula (1):

$$-(SiR^1{}_{2-b}X_bO)_m-SiR^2{}_{3-a}X_a \qquad (1)$$

in the formula, $R^1$ and $R^2$ each is an alkyl group containing 1 to 20 carbon atoms, an aryl group containing 6 to 20 carbon atoms, an aralkyl group containing 7 to 20 carbon atoms or a triorganosiloxy group represented by $R^3{}_3SiO-$ (in which $R^3$ is a univalent hydrocarbon group containing 1 to 20 carbon atoms and the three $R^3$ groups may be the same or different); when there are two or more $R^1$ or $R^2$ groups, they maybe the same or different; X is a hydrolyzable group or a hydroxyl group and, when there are two or more X groups, they may be the same or different; a is an integer selected from among 0 to 3, b is an integer selected from among 0 to 2, provided that the relation a+mb≧1 is satisfied; the values of b in the m $(SiR^1{}_{2-b}X_bO)$ groups may not be the same; and m is an integer selected from among 0 to 19.

Referring to the general formula (1), the hydrolyzable group is not particularly restricted but may be any of those hydrolyzable groups known in the art. As specific examples, there may be mentioned, for example, a hydrogen atom, and alkoxy, acyloxy, ketoximato, amino, amido, aminoxy, mercapto, alkenyloxy and like groups. Among these, an alkoxy group is particularly preferred in a view that it hydrolyzes moderately and is easy to handle.

These hydrolyzable groups or hydroxyl groups can be bound to each silicon atom within the rage of one to three groups, and (a+mb) is preferably within the range of 1 to 5. In cases where two or more hydrolyzable or hydroxyl groups are bound to the reactive silicon group, they may be the same or different. The number of silicon atoms forming this reactive silicon group maybe one or two or more. In the case of silicon atoms connected together via siloxane bonding or the like, the number is preferably up to 20. In particular, a reactive silicon group represented by the general formula (2):

$$-SiR^2{}_{3-a}X_a \qquad (2)$$

in the formula, $R^2$, X and a are as defined above, is preferred because of its easy availability.

At least one reactive silicon group, preferably 1.1 to 5 reactive silicon groups exist per molecule of the isobutylene polymer on an average. If the number of reactive silicon groups contained in the molecule is less than 1, the curability will be insufficient and good rubber elasticity will hardly be manifested. The reactive silicon group may occur terminally and/or internally in the isobutylene polymer molecular chain. In particular when the polymer molecule has at least one of reactive silicon groups at a terminus of the molecular chain thereof, the content of effective network chains in the isobutylene polymer component contained in the final cured product becomes high, which is favorable in a view that high-strength, high-elongation rubbery cured products may liable to be obtained. These isobutylene polymers having a reactive silicon group(s) may be used singly or two or more species may be used in combination.

The isobutylene polymer so referred to herein is a polymer containing therein at least 50% by weight, preferably at least 80% by weight, more preferably at least 90% by weight, of isobutylene units. As the monomer(s) other than isobutylene, there may be mentioned those aliphatic hydrocarbon compounds mentioned above, styrene, α-methylstyrene, acrylonitrile and the like.

A number average molecular weight of the isobutylene polymer is preferably about 500 to 100,000, more preferably about 1,000 to 40,000, in view of the ease in handling, and the like. Furthermore, as for the molecular weight distribution (Mw/Mn), a molecular weight distribution as narrow as possible is desirable for attaining a lower viscosity at the same molecular weight level. Preferably, it is not more than 2.0, more preferably not more than 1.5, as determined by gel permeation chromatography (GPC) method (mobile phase: tetrahydrofuran, on the styrene equivalent basis).

An isobutylene polymer having reactive silicon groups internally in the molecule can be produced by adding a vinylsilane or allylsilane, which contains a reactive silicon group, to a monomer mainly comprising isobutylene followed by copolymerization. Furthermore, an isobutylene polymer having reactive silicon groups internally and terminally can be produced by copolymerizing a vinylsilane or allylsilane which contains a reactive silicon group other than monomers constituting a main chain, followed by introducing a reactive silicon group into the polymer terminus, in polymerization for producing the above-mentioned isobutylene polymer terminally having reactive silicon groups.

Various characteristics of the composition of the present invention can be designed and controlled based on the (A) component, the molecular structure of the (B) component, the (A)/(B) component ratio and the characteristics of the other components contained therein. In the practice of the invention, the content ratio between the (A) component and (B) component is not particularly restricted. For attaining the desired characteristics, however, the ratio (A)/(B) is preferably within the range of 1/99 to 99/1, more preferably 10/90 to 90/10, on the weight basis.

The curable composition of the invention manifests particularly good characteristics owing to the fact that the hydrolyzable groups bound to the silicon groups which the (B) component isobutylene polymer has are partly or wholly hydrolyzed and form siloxane linkages (silanol condensation reaction).

For causing the (B) component to be cured by silanol condensation reaction, a silanol condensation catalyst [(C) component] may be added to the composition of the invention. As specific examples of the silanol condensation catalyst, there may be mentioned, for example, silanol condensation catalysts such as tin, aluminum or titanium compounds, amine compounds or salts of amine compounds and carboxylic acid or other acids; low-molecular-weight polyamide resins obtainable from excess polyamine and a polybasic acid; reaction products from excess polyamine and an epoxy compound; amino group-containing silane coupling agent type amine compounds, such as γ-aminopropyltrimethoxysilane and N-(β-aminoethyl)

aminopropylmethyldimethoxysilane; and other silanol condensation catalysts known in the art, such as other acidic catalysts and basic catalysts. The silanol condensation catalyst can be freely selected according to the use conditions. From the viewpoint of storage stability, curing rate and availability, tin compounds, in particular dibutyltin compounds, are preferred. The silanol condensation catalysts mentioned above may be used singly or two or more of them may be used in admixture. From the viewpoint of curing rate and storage stability, the silanol condensation catalyst is used preferably in an amount within the range of 0.01 to 50 parts (parts by weight; hereinafter the same shall apply), more preferably 0.1 to 30 parts, still more preferably 0.1 to 5 parts, per 100 parts of the reactive silicon group-containing isobutylene polymer (B).

In the composition of the invention, there may be appropriately incorporated, in addition to the above (A) component and (B) component, a hydrolyzable group-containing silane compound [(D) component], a plasticizer [(E) component] and/or a tackifier resin [(F) component] according to the characteristics required for each use of the composition.

The hydrolyzable group-containing silane compound [(D) component] is effective in improving the adhesiveness and adjusting the curability, storage stability and the like, and can appropriately be used according to the characteristics required. The hydrolyzable group-containing silane compound species is not particularly restricted so long as the one selected is usable. Thus, there may be mentioned, for example, silane compounds having such a hydrolyzable group as a methoxy, ethoxy, propoxy or oxime group. The functional group other than the silyl group which occurs in the hydrolyzable group-containing silane compound is not particularly restricted so long as the group selected is usable. Thus, there may be mentioned as examples, vinyl, methacryl, acryl, mercapto, hydroxyl, isocyanato, amino, amido, glycidyl and the like groups. More specific examples are ethyl silicate, silicate condensates, vinyltrimethoxysilane, 3-methacryloxypropyltrimethoxysilane, 3-aminopropyltrimethoxysilane, 3-aminopropylmethyldimethoxysilane, 3-aminopropylmethyldiethoxysilane, 3-aminopropyltriethoxysilane, N-methyl-3-aminopropyltrimethoxysilane, N-phenyl-3-aminopropyltrimethoxysilane, N-(β-aminoethyl) aminopropylmethyldimethoxysilane, 3-isocyanatopropyltrimethoxysilane, 3-isocyanatopropyltriethoxysilane, 3-glycidylpropyltrimethoxysilane and the like.

The above silane compound is used preferably within the range of 0.01 to 50 parts, more preferably 0.1 to 30 parts, still more preferably 1 to 10 parts, per 100 parts of the isobutylene polymer (B) having a reactive silicon group(s).

The silane compounds mentioned above may be used singly or two or more of them may be used in admixture. The method of use which comprises using at least one compound selected from among silicate, vinyltrimethoxysilane and 3-methacryloxypropyltrimethoxysilane can be employed from the viewpoint of storage stability and, from the viewpoint of providing adhesiveness, the method of use which comprises using at least one compound selected from among 3-aminopropyltrimethoxysilane, 3-aminopropylmethyldimethoxysilane, 3-aminopropylmethyldiethoxysilane, 3-aminopropyltriethoxysilane, N-methyl-3-aminopropyltrimethoxysilane, N-phenyl-3-aminopropyltrimethoxysilane, N-(β-aminoethyl) aminopropylmethyldimethoxysilane, 3-isocyanatopropyltrimethoxysilane, 3-isocyanatopropyltriethoxysilane and 3-glycidylpropyltrimethoxysilane can also be employed.

The plasticizer [(E) component] is used for adjusting the flow characteristics and can freely be selected from among the plasticizers in general use according to need. Those compatible with the isobutylene polymer, which is the (B) component to be used according to the invention, are more preferred. As specific examples, there may be mentioned process oils, olefin oligomers, polybutene, chlorinated olefins, hydrogenatedphthalate esters and ester type oligomers. These plasticizers may be used singly or two or more of them may be used in combination. It is also possible to use these plasticizers together with another plasticizer, for example a phthalate ester or adipate ester. The amount of use of the plasticizer is decided depending on the other formulation components and the desired characteristics and is not particularly restricted so long as the amount employed is usable. Preferably, the plasticizer is used within the range of 10 to 1,000 parts, more preferably 10 to 200 parts, per 100 parts of the sum of the (A) component and (B) component.

The tackifier resin [(F) component] is used for the purpose of adjusting the tackiness, adhesiveness, resin compatibility, viscosity control and the like. It can freely be selected from those in general use according to the purpose. As examples, there may be mentioned petroleum resins, hydrogenated petroleum resins, phenolic types, terpene types, rosin ester types, modified terpene types, hydrogenated terpene types, pinene types, coumarone-indene types, styrenic types and the like. The amount of use of the tackifier resin is decided depending on the other formulation components and the desired characteristics and is not particularly restricted so long as the amount employed is usable. Preferably, it is used within the range of 2 to 1,000 parts, more preferably 10 to 100 parts, per 100 parts of the sum of the (A) component and (B) component.

In the composition of the invention, there may appropriately be incorporated, other than the above components, thermoplastic resins, waxes, fillers, hindered phenol or hindered amine antioxidants or ultraviolet absorbers, light stabilizers, pigments, surfactants, foaming agents, adhesiveness providing agents and so forth according to need and according to the characteristics required for each use of the composition.

In the practice of the invention, the thermoplastic resins are used for the purpose of providing hardness, strength, extensibility and like characteristics, reducing cost and adjusting moldability and can be selected, according to the purpose, from among plastics, rubbers and the like, for example, polyethylene, polypropylene, α-olfein copolymers, EPDM, butyl rubbers, polyisobutylene, polystyrene, polyvinyl chloride and the like.

In the practice of the invention, the fillers are used for the purpose of providing hardness, strength, extensibility and like characteristics and reducing cost. Usable are calcium carbonate, clays, talc, silica, alumina and the like. For providing flame retardancy, aluminum hydroxide, magnesium hydroxide, ammonium phosphate and like flame retardant fillers can also be used. Further, for providing hygroscopicity, such hygroscopic fillers as zeolites, silica gel and molecular sieves can be used.

The production method of the composition of the invention is not particularly restricted. Effective are the method comprising mixing up, by kneading, the (A) and (B) components and each ingredient mentioned above using a mixer, roll, kneader, molding machine or the like and the method comprising blending components by dissolving them in an appropriate amount of solvent.

As the method of molding the composition of the invention, conventional methods can be used, for example by various molding methods such as extrusion molding, injection molding and compression molding, etc. As the method of applying the composition of the invention, conventional methods can be used, for example the method comprising applying the composition using a hot melt applicator, and the method comprising diluting the composition with a solvent, applying the same at room temperature or with heating and allowing the solvent to evaporate at room temperature or with heating.

The composition of the invention, when the (B) component is cured by the silanol condensation reaction, manifests particularly good characteristics. Supplying water is effective for the silanol condensation reaction. The method of supplying water in the practice of the invention is not particularly restricted but, for example, (1) the method comprising supplying water in the step of kneading of the composition, (2) the method comprising supplying water just before molding of the kneaded composition, and (3) the method comprising supplying water after molding of the kneaded composition and the like methods are preferred.

It is also possible to use water or a metal salt hydrate as the source of the water required. As metal salt hydrates, those commercially available in general can be widely used, for example alkaline earth metal salt hydrates and other metal salt hydrates. Preferred among these are alkali metal salt hydrates and alkaline earth metal salt hydrates, specifically $MgSO_4 \cdot 7H_2O$, $Na_2CO_3 \cdot 10H_2O$, $Na_2SO_4 \cdot 10H_2O$, $Na_2S_2O_3 \cdot 5H_2O$, $Na_3PO_4 \cdot 12H_2O$, $Na_2B_4O_7 \cdot 10H_2O$ and the like. The metal salt hydrate is used preferably in an amount within the range of 0.01 to 50 parts, more preferably 0.1 to 30 parts, still more preferably 1 to 20 parts, particularly preferably 2 to 10 parts, per 100 parts of the isobutylene polymer (B) having a reactive silicon group(s). The above metal salt hydrates may be used singly or two or more species may be used in admixture.

The curable composition of the invention can be used with special advantage as a rubbery material, for example in tires, sealants, gaskets and adhesives or pressure sensitive adhesives. It can also be used in such fields as food related, miscellaneous goods for daily use, toys, sporting goods, stationary, automotive interior and exterior decoration, civil engineering and building such as sheets for civil engineering and waterproof sheets for civil engineering, audiovisual (AV) and other household electric appliances, office automation (OA) and other office goods and supplies, articles of clothing and footwear, textiles, medical supplies such as various catheters, containers and caps, sanitary products such as paper diapers and sanitary items, packaging materials for transportation, electric wire related such as electric wire coverings, cables, connectors and plugs, vibration isolating, aseismic base isolation, vibration reducing and like damping materials, asphalt modification agent and resin modification agent and so on.

Several methods of use in certain specific applications are given below by way of example. These examples, however, are not restrictive of the scope of the invention.

The (A) components, in particular styrene block polymers, are widely used in the art as a main component of adhesives and pressure sensitive adhesives. The curable composition of the invention can be used effectively in such field of use.

When the composition is used as adhesives or pressure sensitive adhesives for instance, generally, compositions comprising a styrenic block polymer [(A) component] as a main component have excellent characteristics at ordinary temperature but have the problem that they become fluid at elevated environmental temperatures. When the curable composition of the invention is used, the (B) component isobutylene polymer is crosslinked by the silanol condensation reaction, so that the fluidity at elevated temperatures can be prevented without markedly lowering the characteristics of the styrenic block polymer [(A) component].

The method of use of the above adhesive or pressure sensitive adhesive is not restricted but may be within the ordinary range allowing the use thereof. Usable are, for example, the method comprising promoting the silanol condensation reaction by supplying water to the curable composition applied to a substrate by heating and melting (hot melt) or diluting with a solvent, and the method comprising supplying water prior to application. When the former method is employed, steam moisture can be supplied by utilizing the water in the air, by steam or humidifying step, or by immersing in water, and, by keeping the thickness of the curable composition relatively thin, preferably not more than 10 mm, more efficient production becomes possible.

The specific uses of the above adhesive or pressure sensitive adhesive are not particularly restricted. The composition can be used in pressure sensitive adhesive tapes and as hot melt adhesives. Since it has good weathering resistance and heat resistance, the composition can be used in the fields of building, electricity, automobiles, etc.

The (A) components, in particular styrene-based block polymers are widely used also as main components in gaskets, sealants and moldings. The curable composition of the invention can be used advantageously in such fields of application.

In such fields of application, conventionally, the moldability (fluidity at elevated temperatures) and the physical properties in application are controlled through the molecular structure of the (A) component, for example in the case of the styrenic block polymers, these are controlled through the molecular weights of the aliphatic hydrocarbon block and styrenic block, the proportion therebetween, the structures thereof and a low-viscosity additive. However, there is the problem that good moldability (fluidity at elevated temperatures) leads to decreases in strength and physical properties at elevated temperatures. The curable composition of the invention, when the structure of the (B) component isobutylene polymer is appropriately selected, can show good moldability and can prevent physical properties from deteriorating without markedly decreasing the characteristics of the styrenic block polymer [(A) component].

The production method of the above-mentioned gaskets, sealants and moldings is not restricted but may be within the ordinary applicable range. For attaining good moldability, however, it is effective to control the silanol condensation reaction. Thus, mention may be made of the method comprising promoting the silanol condensation reaction by supplying water to the curable composition discharged in a heated and melted state from a molding machine or applicator, and the method comprising adding water before discharge, for instance.

When the method comprising promoting the silanol condensation reaction by supplying water is employed, the supply of water can be realized by utilizing the water in the air, by steam or humidifying step, or by immersing in water, for instance.

For the method comprising adding water prior to discharge, various methods of addition are available, for example (1) the method comprising admixing water and/or the (C) component silanol condensation catalyst by means of a mixing machine or a static or mechanical mixer before discharge, (2) the method comprising adding a highly temperature-dependent silanol catalyst and thereby controlling the reaction by changing the temperature, and (3) the method comprising adding a compound with water adsorbed thereon and controlling the reaction by changing the temperature are mentioned.

The specific uses of the above gaskets, sealants and moldings are not particularly restricted but there may be mentioned, for example, hot melt sealants, gaskets for building purposes, moldings for automotive use and damping materials. The production method to be taken for these applications comprises, for example, molding the composition for use as moldings or applying to substrates. From the productivity viewpoint, the molding method comprising heating and melting is effective.

The curable composition of the invention is also effective as a double layer glazing spacer and/or double layer glazing sealant. In the art, butyl-based hot melt sealants are known as the resin to be used in double layer glazing in view of their low moisture permeability and weathering resistance. With them, however, it is difficult to secure a balance between the hardness and strength at ordinary temperature and the fluidity at elevated temperatures, hence improvements have been made by combinedly using an α-olefin or using a metal sheet, for instance. However, the characteristics obtainable are not satisfactory, for example worsening in physical properties at elevated temperatures. When the curable composition of the invention is used, it is possible to mitigate the reductions in physical properties at elevated temperatures. In those applications, SEBS, SEPS and SIBS are preferably used as the (A) component from the weathering resistance viewpoint and, in particular, SIBS is preferred from the low moisture permeability viewpoint. Other than the components according to the invention, the addition of thermoplastic resins such as polyethylene, polypropylene, α-olefin copolymers, EPDM, butyl rubbers and polyisobutylene or hygroscopic compounds such as zeolite is effective according to the required characteristics.

The method for adhering comprises applying a curable composition according to the present invention to a surface of a substrate to be adhered, disposing another substrate on said surface of the substrate prior to curing the curable composition, and keeping them at room temperature or under heat to attain adhesiveness.

The method for producing a pressure sensitive adhesive sheet comprises applying a curable composition according to the present invention to a surface of a sheet substrate, and curing the curable composition to a extent sufficient for attaining pressure sensitive adhesiveness to obtain a pressure sensitive adhesive sheet.

The method for producing a pressure sensitive adhesive film comprises applying a curable composition according to the present invention to a surface of a separate material, curing the curable composition to a extent sufficient for attaining pressure sensitive adhesiveness to obtain a film-covered separate material, and releasing a pressure sensitive adhesive film from said film-covered separate material.

The method for producing a gasket comprises injecting a curable composition according to the present invention onto a substrate or into a mould, and curing the curable composition on the substrate or in the mould to obtain a gasket.

BEST MODES FOR CARRYING OUT THE INVENTION

The following examples illustrate the invention more specifically. These examples are, however, by no means limitative of the scope of the invention. Modifications of the invention can be made without departing from the scope thereof.

EXAMPLE 1

100 weight parts of Kraton D-1107 (product of Shell Japan) as (A) component, 77 weight parts of isobutylene polymer containing a methyldimethoxysilyl group at a molecular terminus [number average molecular weight 10,400, molecular weight distribution (GPC method) 1.2, silicon group content per molecule ($^1$H-NMR method) 1.5 to 1.9] as (B) component, 2 weight parts of the silanol condensation catalyst Neostann U-220 (product of Nitto Kasei) as (C) component, 3 weight parts of the silane coupling agent A-174 (product of Nippon Unicar) as (D) component, 148 weight parts of the paraffin-based process oil PS-32 (product of Idemitsu Kosan) as (E) component, 86 weight parts of the terpene-based tackifier resin Px-800 (product of Yasuhara Chemical) as (F) component and 57 parts of the paraffin wax 135F (product of Nippon Seiro) were blended up in an atmosphere of flowing dry nitrogen at 160° C. to 120° C. to give a homogeneous composition. This composition, in a molten state at 120° C., was applied to a PET film to a thickness of 0.5 mm using a hot melt applicator and, after cooling, a pressure sensitive adhesive was obtained. This pressure sensitive adhesive was allowed to stand at 23° C. and 55% RH for 3 days and then at 50° C. and 80% RH for 15 hours. This pressure sensitive adhesive was applied to an SUS sheet and allowed to stand at 120° C. for 2 hours. Melting of the pressure sensitive adhesive was not observed.

EXAMPLE 2

100 weight parts of Kraton D-1107 (product of Shell Japan) as (A) component, 77 weight parts of isobutylene polymer containing a methyldimethoxysilyl group at a molecular terminus [number average molecular weight 10,400, molecular weight distribution (GPC method) 1.2, silicon group content per molecule ($^1$H-NMR method) 1.5 to 1.9] as (B) component, 2 weight parts of the silanol condensation catalyst Neostann U-220 (product of Nitto Kasei) as (C) component, 3 weight parts of the silane coupling agent A-174 (product of Nippon Unicar) as (D) component, 148 weight parts of the paraffin-based process oil PS-32 (product of Idemitsu Kosan) as (E) component and 86 weight parts of the terpene-based tackifier resin Px-800 (product of Yasuhara Chemical) as (F) component were dissolved in toluene at 80° C. to 100° C. to a concentration of 50%, and the solution was applied to a PET film to a coat layer thickness of 50 μm using a bar coater. By allowing the coat layer in an oven maintained at 120° C. for 10 minutes to give a pressure sensitive adhesive. This pressure sensitive adhesive was cured at 50° C. and 80% RH for 5 days, then applied to an SUS sheet and allowed to stand at 120° C. for 2 hours. Melting of the pressure sensitive adhesive was not observed.

COMPARATIVE EXAMPLE 1

Using 100 weight parts of Kraton D-1107 (product of Shell Japan) as (A) component, 125 weight parts of the paraffin-based process oil PS-32 (product of Idemitsu Kosan) as (E) component, 86 weight parts of the terpene-based tackifier resin Px-800 (product of Yasuhara Chemical) as (F) component and 57 parts of the paraffin wax 13SF (product of Nippon Seiro), a pressure sensitive adhesive was obtained in the same manner as in Example 1. This pressure sensitive adhesive was allowed to stand at 23° C. and 55% RH for 3 days and then at 50° C. and 80% RH for 15 hours. This pressure sensitive adhesive was applied to an SUS sheet and allowed to stand at 120° C. Within 30 minutes, the pressure sensitive adhesive melted and bulged out around the PET film.

COMPARATIVE EXAMPLE 2

Using 100 weight parts of Kraton D-1107 (product of Shell Japan) as (A) component, 125 weight parts of the paraffin-based process oil PS-32 (product of Idemitsu Kosan) as (E) component and 86 weight parts of the terpene-based tackifier resin Px-800 (product of Yasuhara Chemical) as (F) component, a pressure sensitive adhesive was obtained in the same manner as in Example 2. This pressure sensitive adhesive was cured at 50° C. and 80% RH for 5 days and then applied to an SUS sheet and allowed to stand at 120° C. In about 1 hour, the pressure sensitive adhesive melted.

EXAMPLE 3

100 weight parts of Tuftec 1031 (product of Asahi Kasei) as (A) component, 77 weight parts of isobutylene polymer containing a methyldimethoxysilyl group at a molecular terminus [number average molecular weight 10,400, molecular weight distribution (GPC method) 1.2, silicon group content per molecule ($^1$H-NMR method) 1.5 to 1.9] as (B) component, 2 weight parts of the silanol condensation catalyst Scat-27 (product of Sankyo Organic Chemicals) as (C) component and 27 weight parts of the paraffin-based process oil PS-32 (product of Idemitsu Kosan) as (E) component were blended up using a Laboplast mill (product of Toyo Seiki) maintained at 160° C. to give a homogeneous composition. The melt viscosity of this composition was measured using a capillary rheometer (product of Shimadzu) and found to be 930 Pa·s at 100° C. While melt-kneading at 140° C., this composition was admixed by kneading with water just before discharge and then discharged, whereby a transparent molding was obtained. This molding showed a JIS-A hardness of 48 at 23° C. This molding was allowed to stand at 100° C. for 1 week. No changes in geometry were observed.

EXAMPLE 4

400 weight parts of Tuftec 1031 (product of Asahi Kasei) as (A) component, 77 weight parts of isobutylene polymer containing a methyldimethoxysilyl group at a molecular terminus [number average molecular weight 10,400, molecular weight distribution (GPC method) 1.2, silicon group content per molecule ($^1$H-NMR method) 1.5 to 1.9] as (B) component, 23 weight parts of the paraffin-based process oil PS-32 (product of Idemitsu Kosan) as (E) component and 2 weight parts of the silanol condensation catalyst Scat-27 (product of Sankyo Organic Chemicals) as (C) component were blended up using a Laboplast mill (product of Toyo Seiki) maintained at 160° C. to give a homogeneous composition. The melt viscosity of this composition was measured using a capillary rheometer (product of Shimadzu) and found to be 1,300 Pa·s at 140° C. While melt-kneading at 140° C., this composition was admixed by kneading with water just before discharge and then discharged, whereby a transparent molding was obtained. This molding had a JIS-A hardness of 72 at 23° C. This molding was allowed to stand at 120° C. for 1 week. No changes in geometry were observed.

COMPARATIVE EXAMPLE 3

100 weight parts of Tuftec 1031 (product of Asahi Kasei) as (A) component, 77 weight parts of isobutylene polymer containing an allyl group at a molecular terminus [number average molecular weight 10,200, molecular weight distribution (GPC method) 1.2] as (B) component, 23 weight parts of the paraffin-based process oil PS-32 (product of Idemitsu Kosan) as (E) component and 2 weight parts of the silanol condensation catalyst Scat-27 (product of Sankyo Organic Chemicals) as (C) component were blended up using a Laboplast mill (product of Toyo Seiki) maintained at 160° C. to give a homogeneous composition. The melt viscosity of this composition was measured using a capillary rheometer (product of Shimadzu) and found to be 900 Pa·s at 100° C. While melt-kneading at 140° C., this composition was discharged, whereby a transparent molding was obtained. This molding was tackier as compared with Example 3 and had a JIS-A hardness of 28 at 23° C., which was lower as compared with Example 3. This molding was allowed to stand at 100° C. for 1 week. Melting was observed and the sample deformed.

COMPARATIVE EXAMPLE 4

400 weight parts of Tuftec 1031 (product of Asahi Kasei) as (A) component, 77 weight parts of isobutylene polymer containing an allyl group at a molecular terminus [number average molecular weight 10,200, molecular weight distribution (GPC method) 1.2] as (B) component, 23 weight parts of the paraffin-based process oil PS-32 (product of Idemitsu Kosan) as (E) component and 2 weight parts of the silanol condensation catalyst Scat-27 (product of Sankyo Organic Chemicals) as (C) component were blended up using a Laboplast mill (product of Toyo Seiki) maintained at 160° C. to give a homogeneous composition. The melt viscosity of this composition was measured using a capillary rheometer (product of Shimadzu) and found to be 1,200 Pa·s at 140° C. While melt-kneading at 140° C., this composition was discharged, whereby a transparent molding was obtained. This molding had a JIS-A hardness of 60 at 23° C., which was lower as compared with Example 4. This molding was allowed to stand at 120° C. for 1 week. Partial melting of the sample was observed.

COMPARATIVE EXAMPLE 5

The melt viscosity of the (A) component Tuftec 1031 (product of Asahi Kasei) was measured using a capillary rheometer (product of Shimadzu) and found to be 1,100 Pa·s at 160° C. An attempt was made to melt this composition at 140° C. but the viscosity was so high that it could not be discharged.

EXAMPLE 5

100 weight parts of a styrene-isobutylene-styrene block copolymer (hereinafter referred to as SIBS for short; number average molecular weight 89,000, molecular weight distribution 1.18) as (A) component, 50 weight parts of isobutylene polymer containing a methyldimethoxysilyl group at a molecular terminus [number average molecular weight 5,600, molecular weight distribution (GPC method) 1.3, silicon group content per molecule ($^1$H-NMR method) 1.5 to 1.9] as (B) component, 0.5 weight part of Irganox 1010 (product of Ciba-Geigy) and 1.75 weight parts of a mixture prepared in advance by blending 1.5 weight parts of stannous octylate (Neostann U-28; product of Nitto Kasei) with 0.25 weight part of laurylamine (Farmin 20D; product of Kao) at room temperature were kneaded up using a Laboplast mill (product of Toyo Seiki) maintained at 170° C. for 15 minutes to give a rubber composition. The rubber composition obtained had a gel fraction of at least 30%. This rubber composition was compression molded at 170° C. to give a sheet.

COMPARATIVE EXAMPLE 6

100 weight parts of SIBS, 50 weight parts of butyl rubber with a number average molecular weight of 206,000 (Butyl 365; product of JSR) and 0.5 part of Irganox 1010 (product of Ciba-Geigy) were blended up using a Laboplast mill (product of Toyo Seiki) maintained at 170° C. for 15 minutes to give a rubber composition. The rubber composition obtained had a gel fraction of less than 1%. This rubber composition was compression molded at 170° C. as well to give a sheet.

The sheets obtained in the above manner were stored at 120° C. for 10 days. While the sheet of Example 5 maintained its original form, the sheet of Comparative Example 6 melted and no longer maintained its original form. It was thus confirmed that the resin composition of the present invention is improved in heat resistance.

EXAMPLE 6

100 weight parts of SIBS (number average molecular weight 89,000, molecular weight distribution 1.18) as (A) component, 100 weight parts of isobutylene polymer containing a methyldimethoxy silyl group at a molecular terminus [number average molecular weight 5,000, molecular weight distribution (GPC method) 1.3, silicon group content per molecule ($^1$H-NMR method) 1.5 to 1.9] as (B) component, 0.5 weight part of Irganox 1010 (product of Ciba-Geigy), 1 weight part of silane coupling agent A-174, 2 weight parts of silane coupling agent A-1100 (both being products of Nippon Unicar) and 3.5 weight parts of a mixture prepared by curing 3 weight parts of 2-ethylhexanoic acid and 0.5 weight part of laurylamine at room temperature were kneaded up using a Laboplast mill maintained at 160 to 120° C. under reduced pressure to prepare a composition. The above composition was applied on a glass (200 mm×200 mm×10 mm) at 5 mm inside from the edge thereof and with a width of about 10 mm and a thickness of about 10 mm in a bead-like form using a hot melt gun. After allowing the same to stand for about 2 minutes, a glass was fitted on the top and they were cured for 3 weeks under 30° C. and 60% RH to give a double layer glass sample. This cured product became such a good rubber-like cured product as having a JIS-A hardness of about 42. This double layer glass sample was allowed to stand at 80° C. for 4 weeks, however, no changes in geometry were occurred. No changes were observed after exposure of 3,000 hours under sunshine Weather-O-meter, either. This rubber-like cured product had extremely low water permeability as not more than 2 g/m$^2$/24-hours and oxygen permeability as 1 g/m$^2$/24-hours.

COMPARATIVE EXAMPLE 7

100 weight parts of SIBS (number average molecular weight 89,000, molecular weight distribution 1.18) as (A) component, 100 weight parts of process oil PS-32, 0.5weight part of Irganox 1010 (product of Ciba-Geigy) and 1 weight part of silane coupling agent A-174 were kneaded up using a Laboplast mill maintained at 160 to 120° C. under reduced pressure to prepare a composition. A double layer glass sample was prepared using the above composition in the same manner as in Example 7. This cured product became such a rubber-like cured product as having a JIS-A hardness of about 32. This double layer glass sample was allowed to stand at 80° C. for 4 weeks, and, as a result, about 5% of geometric change was observed in the thickness direction.

COMPARATIVE EXAMPLE 8

100 weight parts of isobutylene polymer containing a methyldimethoxy silyl group at a molecular terminus [number average molecular weight 5,000, molecular weight distribution (GPC method) 1.3, silicon group content per molecule ($^1$H-NMR method) 1.5 to 1.9] as (B) component, 0.5 weight part of Irganox 1010 (product of Ciba-Geigy), 1 weight part of silane coupling agent A-174, 2 weight parts of silane coupling agent A-1100 (both being products of Nippon Unicar) and 3.5 weight parts of a mixture prepared by curing 3 weight parts of 2-ethylhexanoic acid and 0.5 weight part of laurylamine at room temperature were kneaded up using a Laboplast mill maintained at 120° C. under reduced pressure to prepare a composition. An attempt was made to prepare a double layer glass sample using the above composition in the same manner as in Example 7, but the applied composition ran and it was impossible to maintain a bead-like form.

Industrial Applicability

The rubber composition of the invention has excellent balance among flexibility, mechanical properties, moldability and workability and also has good heat resistance. Therefore, it can be used with special advantage as a rubbery material, for example in tires, sealants, gaskets and adhesives or pressure sensitive adhesives. It can also be used in such fields as food related, miscellaneous goods for daily use, toys, sporting goods, stationary, automotive interior and exterior decoration, civil engineering and building such as sheets for civil engineering and waterproof sheets for civil engineering, audiovisual (AV) and other household electric appliances, office automation (OA) and other office goods and supplies, articles of clothing and footwear, textiles, medical supplies such as various catheters, containers and caps, sanitary products such as paper diapers and sanitary items, packaging materials for transportation, electric wire related such as electric wire coverings, cables, connectors and plugs, vibration isolating, aseismic base isolation, vibration reducing and like damping materials.

What is claimed is:

1. A curable composition comprising
   (A) a block copolymer composed of a polymer block mainly comprising a vinyl aromatic compound by mole and a polymer block mainly comprising isobutylene by mole and
   (B) an isobutylene polymer having a silicon group bound to a hydrolyzable group or a hydroxyl group.

2. The curable composition according to claim 1,
   wherein, in the (B) component isobutylene polymer, the silicon group bound to a hydrolyzable group or hydroxyl group is represented by the general formula (1):

$$—(SiR^1{}_{2-b}X_bO)_m—SiR^2{}_{3-a}X_a \tag{1}$$

in the formula, R$^1$ and R$^2$ each is an alkyl group containing 1 to 20 carbon atoms, an aryl group containing 6 to 20 carbon atoms, an aralkyl group containing 7 to 20 carbon atoms or a triorganosiloxy group represented by R$^3{}_3$SiO—, in which R$^3$ is a univalent hydrocarbon group containing 1 to 20 carbon atoms and the three R$^3$ groups may be the same or different; when there are two or more or R$^1$ or R$^2$ groups, they may be the same or different; X is a hydrolyzable group or a hydroxyl group and, when there are two or more X groups, they may be the same or different; a is an integer selected from among 0 to 3, b is an integer selected from among 0 to 2, provided that the relation a+mb≧1 is satisfied; the values of b in the m ($SiR^1_{2-b}X_bO$) groups may not be the same; and m is an integer selected from among 0 to 19.

3. The curable composition according to claim 1, which comprises a tackifier resin as a (F) component.

4. The curable composition according to claim 1, wherein the (B) component isobutylene polymer has at least one silicon group bound to a hydrolyzable group or a hydroxyl group at a terminus of the polymer.

5. The curable composition according to claim 1, wherein a number average molecular weight of the (B) component isobutylene polymer is 1,000 to 40,000.

6. The curable composition according to claim 1, wherein the (A) component block copolymer is SIBS.

7. A sealant which comprises the curable composition according to claim 1.

8. An adhesive which comprises the curable composition according to claim 1.

9. A spacer for double glazing which comprises the curable composition according to claim 1.

10. A method of application for applying or molding the curable composition according to claim 1, which comprises applying or molding said curable composition under heating condition.

11. A method of application for applying or molding the curable composition according to claim 1, which comprises applying or molding said curable composition in a state dissolved in a solvent.

12. A method of using the curable composition according to claim 1, which comprises allowing the condensation reaction of the (B) component to proceed by water after applying or molding said curable composition.

* * * * *